April 29, 1952     J. W. FRAZIER     2,594,902
DEVICE FOR MOUNTING AND STRETCHING PELTS
Filed March 9, 1948
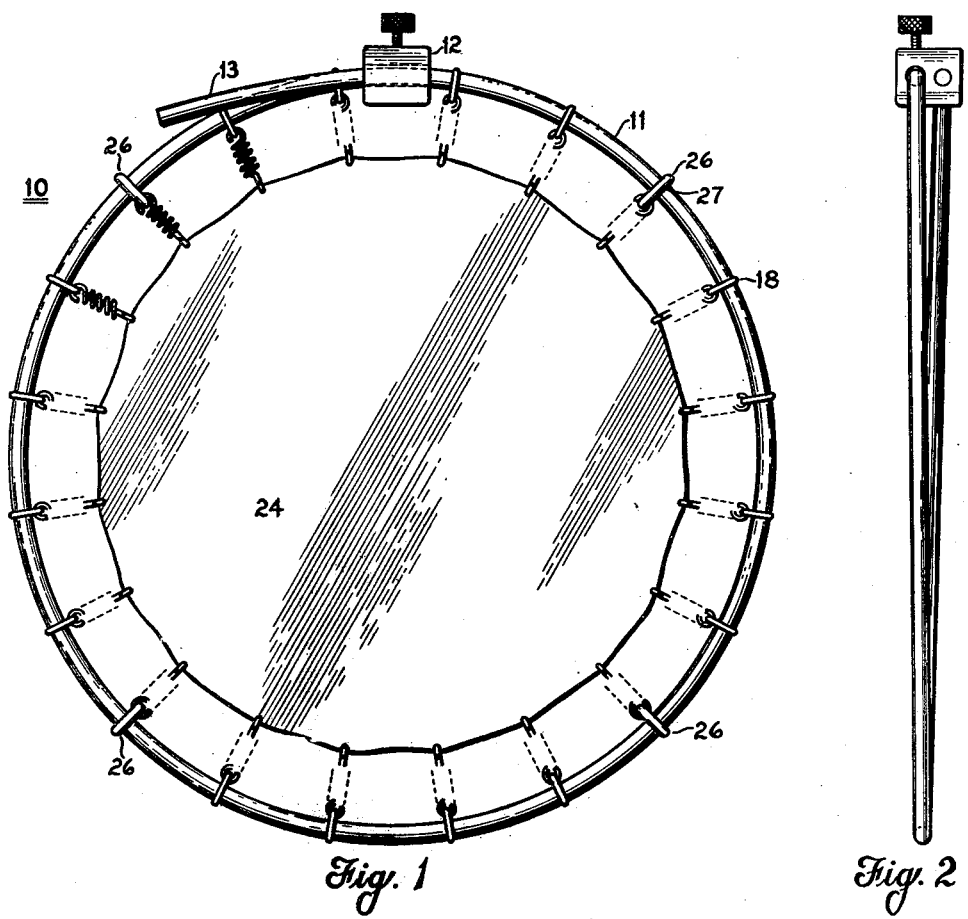
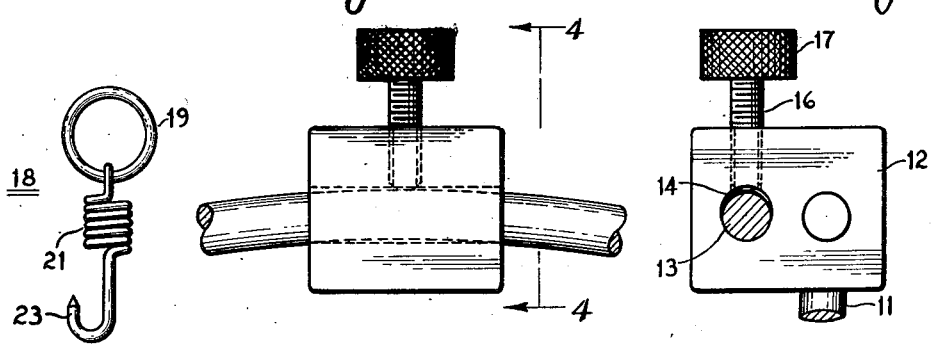
Inventor
John W. Frazier
Attorney Patented Apr. 29, 1952

2,594,902

UNITED STATES PATENT OFFICE 2,594,902

DEVICE FOR MOUNTING AND STRETCHING PELTS

John W. Frazier, Bemus Point, N. Y.

Application March 9, 1948, Serial No. 13,883

1 Claim. (Cl. 45—24)

This invention relates to a device for mounting and stretching the pelts of fur bearing animals.

Prior to the present invention it has been the general practice to cure and stretch pelts on a flat panel. The green or uncured pelt was stretched by hand and tacked or pegged down along its edges to the panel. As the skin of the pelt dried it was necessary to periodically remove some of the edge securing pegs, further stretch the skin, and again tack or peg it down. The purpose of this was to produce a cured pelt having a smooth and unwrinkled skin, and the removal of the pegs and the repeated stretching was continued until the condition of the skin made it impossible to effect further stretching by this hand process. This means of curing and stretching pelts, as with many other types of hand operations, has several drawbacks.

It is well known among animal trappers and pelt dealers that a properly cured pelt has a skin that has been fully stretched and smoothed during the entire curing process. It is an established custom for trappers or other dealers in pelts to sell them at so much per inch in length or width. Of course, the quality and kind of fur, and the unblemished condition and smoothness of the skin are a considerable factor in determining the sale price. It frequently occurs in the method of curing and stretching pelts mentioned above, that the repeated handling—that is, removal stretching and replacement thereof on the mounting panel—not only fails to produce a smooth, unwrinkled skin, but also fails to stretch this skin to its greatest size. Thus, a trapper employing the old hand method of stretching a pelt not only has one that may well be of inferior quality, but also one that, by reason of its lesser size, must be sold for a lesser sum.

It is a purpose and object of the invention to provide a stretching device for pelts that eliminates much of the previously required handling in the curing operation.

It is also an object of the invention to provide a stretching device for pelts that exerts a constant stretching of the skin in all directions during the curing operation.

Another important object of the invention lies in the provision of a stretching device that is capable of accommodating pelts of irregular shapes and sizes.

A further object of the invention lies in the provision of a stretching device that is of simple construction, convenient in use, and inexpensive to manufacture.

Other objects and advantages of the invention will be more fully understood from a consideration of the following specification, taken in conjunction with the accompanying drawing; and in which Fig. 1 is a plan view of one modification of the invention and shows a pelt in the process of being stretched;

Fig. 2 is a side elevational view of the structure of Fig. 1, the pelt carriers being removed to show the frame contour;

Fig. 3 is an enlarged fragmentary elevational view of the structure employed to secure the frame in any given size;

Fig. 4 is another view of the structure of Fig. 3, being taken substantially as indicated by the line 4—4 of that figure; and Fig. 5 is an enlarged view of one of the pelt carriers.

Referring more particularly to the drawing, the reference numeral 10 is employed to generally designate a pelt stretching device in which one form of the invention is embodied. This device is intended to be adaptable to the proper stretching of pelts of different sizes, and to this end the frame, in which the pelt is to be held in stretched condition during drying, is formed from a rod 11. This rod is bent into a generally circular form, substantially as shown in the drawing. The contour, of course, without deviation from the invention, could be of oval shape, should it be found that a particular kind of pelt could be better stretched in a frame of such proportions. One end of the rod 11 is firmly anchored in a block 12 in any suitable manner. The other end 13 of the rod 11 projects through a suitable opening 14 in the block 12, such opening being of sufficient proportions to enable free movement of the rod end therethrough. A locking screw 16, having a knob 17, has threaded engagement with the block and may be rotated to project into the opening 14 into engagement with the end 13. It is evident that when the locking screw 16 is withdrawn from the opening 14, the end 13 may be moved with respect to the block 12, and such movement will increase or decrease the diameter of the frame as a whole.

Mounted on the rod 11 are a multiplicity of pelt carriers 18. Each of these carriers includes a ring 19 that encircles the rod and an expansion spring 21 having one end thereof joined to the ring 19. To the other end of the spring, a pointed hook may be attached, or, as suggested in Fig. 5 of the drawing, the hook 23 may be formed from an extension of the wire of the spring. As shown, the rings 19 permit adjustment of the carriers to any part of the generally circular frame.

When it is desired to mount a pelt in the structure above described, the following procedure is preferably followed: It may be assumed that a pelt 24 has been trimmed to remove undesirable leg, neck, or other undesirable portions, and that it takes substantially the form suggested in the drawing. Diametrically opposite edges of the pelt 24 are first engaged by the hooks 23 of two of four special carriers 26. The carriers 26 differ from those described only in that they are provided with enlarged rings 27 which serve to designate that they should first be engaged with the pelt. Following the operation of engaging hooks 23 of two diametrically opposite carriers 26, the remaining two carriers 26 are engaged with the pelt. At this point in the description, it is evident that the pelt 24 is engaged only by the four carriers 26 which are adjusted as need be along the rod 11 to space them approximately ninety degrees apart about the rod. This serves to stretch the four sides of the pelt. Between any two of the carriers 26 there are shown four of the carriers 18, and these carriers, through their hooks 23, are engaged with adjacent edges of the pelt. Of course, it will be understood that a greater or lesser number of carriers 18 may be provided intermediate of the carriers 26. In engaging any of the carriers with the edge of the pelt, the springs 21 are expanded and, when all of the carriers have been joined to the pelt, each of the springs thereof exerts a pull by reason of which the pelt is in a constant, uniformly distributed stretching strain. Obviously, when the pelt is dried, the skin thereof will have been fully stretched and will be entirely smooth, unwrinkled, and undistorted.

It is contemplated as being within the scope of the invention to provide carriers which may have longer springs than the springs 21 shown, or to provide alternating or grouped carriers having longer and shorter springs. Additionally, the spacing of the hook 23 from the spring may be increased from that shown, and it is also believed to be within the scope of the invention to provide a conventional clamping structure at the end of the spring 21 in lieu of the hook 23. These variations or modifications of the structure described, together with those heretofore mentioned, are therefore considered as being fully within the spirit and intent of the invention insofar as they are set out or covered by the annexed claim.

Having thus set forth my invention what I claim as new and for which I desire protection by Letters Patent is:

A device for mounting and stretching a pelt comprising a resilient rod of substantially circular cross section and shaped to form a generally circular frame with the ends thereof overlapping, clamping means engaging the ends of said rod, said clamping means facilitating changing the diameter of said frame, a plurality of rings mounted on and freely movable along said rod, springs joined at their corresponding ends to said rings, and means on the other ends of said springs adapted to engage and secure an edge portion of a pelt.

JOHN W. FRAZIER.

REFERENCES CITED

The following references are of record in the file of this patent:

UNITED STATES PATENTS

| Number | Name | Date |
| --- | --- | --- |
| 840,232 | McCombie | Jan. 1, 1907 |
| 988,331 | Greulich et al. | Apr. 4, 1911 |
| 2,283,367 | Hintz | May 19, 1942 |
| 2,290,457 | Taylor | July 21, 1942 |
| 2,494,949 | Langdahl | Jan. 17, 1950 |